Patented Dec. 29, 1936

2,066,074

UNITED STATES PATENT OFFICE 2,066,074

MANUFACTURE OF COMPOSITE TITANIUM PIGMENTS

Lonnie W. Ryan, Westfield, and Winfred Joseph Cauwenberg, Elizabeth, N. J., assignors to United Color & Pigment Company, Inc., Newark, N. J., a corporation of New Jersey No Drawing. Application April 10, 1935, Serial No. 15,628

19 Claims. (Cl. 134—58)

This invention relates to new and useful improvements in the manufacture of composite pigments containing titanium dioxide and calcium sulphate, and, in particular to reducing the cost of making high quality pigments of this character.

Such composite pigments are customarily made by the hydrolytic precipitation of hydrated titanium dioxide from a mineral acid solution of titanium, and particularly from a sulphuric acid solution of ilmenite ore, in the presence of calcium sulphate, and calcining the resulting composite precipitate. While it was originally proposed to form the calcium sulphate by a chemical reaction with and within the titanium solution, it has been found preferable to use separately prepared calcium sulphate.

The quality of the finished composite pigment, as well as the speed of the precipitation of hydrated titanium dioxide, is very largely dependent on having the particles of calcium sulphate present in the titanium solution during the hydrolytic precipitation of hydrated titanium dioxide sufficiently fine to serve as nuclei during the precipitation. Ordinary ground gypsum, such as is commercially available for use as a pigment extender and for other purposes has been found to be too coarse for this purpose. It has an average particle size of about 7 microns diameter. It has, therefore, been necessary up to the time of our invention to use artificially prepared calcium sulphate synthesized from lime and sulphuric acid, which is much more expensive than natural gypsum.

We have invented a method by which natural gypsum in particles sufficiently fine for this purpose may be prepared and by precipitating hydrated titanium dioxide in the presence of such particles of finely divided natural gypsum, we have produced composite pigments fully equal in quality to those heretofore made by means of artificially prepared calcium sulphate.

We have observed that in the wet milling of gypsum, as heretofore practiced, the fineness of the particles obtainable is limited by the solution and recrystallization of the gypsum to larger particles. Gypsum is slightly soluble in water. As very fine particles are formed in the wet milling of gypsum, these particles dissolve in the water present and recrystallize as larger particles. The recrystallized particles tend to grow in size during the grinding, thus effectively preventing the reduction of the mass to very fine particles.

In accordance with our invention, this difficulty is eliminated by wet milling gypsum in the presence of a small amount of a substance which decreases the solubility of the gypsum in water and at the same time decreases the rate of crystal growth. For this purpose, we have found certain compounds of calcium, such as hydrated lime, certain sulfates of other elements, such as sodium sulphate and ammonium sulphate, and certain organic compounds, such as glue, gelatin, agar agar and gum arabic, to be particularly effective.

By milling natural gypsum in the presence of one or more of these substances, we have succeeded in reducing the particles to an average diameter of 1.5 microns or less, and such particles we have found satisfactory for use in the manufacture of composite pigments containing calcium sulphate and titanium dioxide.

Immediately after milling in the presence of one or more of the above named substances, the gypsum is mixed with the titanium solution and substantially no recrystallization of the finely milled particles occurs. Upon elevating the temperature of the titanium solution to or near the boiling point after mixing with the finely ground gypsum, we obtain a composite precipitate consisting of hydrated titanium dioxide and minute fragments of milled or fractured crystals of natural gypsum, which, upon separating and calcining, produces a pigment which is equal, if not superior, to composite pigments heretofore obtained by precipitating hydrated titanium dioxide in the presence of artificially prepared calcium sulphate crystals.

A further feature of our invention consists in preventing the oxidation of ferrous compounds which are present as impurities in natural gypsum to less soluble ferric compounds and in reducing ferric compounds which are present to the more soluble ferrous compounds during the milling operation. This permits us to wash out the iron impurities in the natural gypsum so that they may not remain to contaminate the pigment.

To further clarify the nature of our invention, we will describe in detail a specific example of the practice of it.

Natural gypsum ($CaSO_4.2H_2O$), which may previously have been ground to 40 mesh, is mixed with one and one-half times its weight of water containing hydrated lime ($Ca(OH)_2$) amounting to 0.35% of the weight of the gypsum. Most desirably, the water also contains a reducing agent such as sodium sulphite, ammonium sulphite, zinc sulphite, calcium sulphite, sodium hydrosulphite, etc., in the amount of approximately 0.2% of the weight of the gypsum. The gypsum slurry is charged into a pebble mill and wet milled for several hours. This milling procedure reduces the natural gypsum to particles having an average diameter of 1.5 microns or less. This fine particle size is made possible by the presence of the hydrated lime, a substance which prevents the fine gypsum particles from dissolving and thus retards recrystallization and crystal growth. During the milling, the sodium sulphite or other reducing agent prevents the oxidation of ferrous compounds and reduces ferric compounds present in the gypsum to ferrous compounds.

While it is possible to introduce the milled slurry directly into a titanium solution, in our preferred method, we neutralize the alkalinity of the slurry before mixing it with titanium solution, proceeding in a manner which prevents any appreciable recrystallization of the gypsum.

To the milled slurry we add 1.07 parts by weight of water at 100° C. containing the 0.0076 part of 60° Baumé sulphuric acid which is necessary to neutralize the hydrated lime and also just sufficient sulphuric acid to convert any of the sodium sulphite which may not have reacted with ferric compounds into sodium sulphate. The large quantity of hot water added with the sulphuric acid raises the temperature of the neutralized slurry to about 65° C. It is then immediately mixed with the titanium sulphate solution which has previously been raised to 65° C., and the mixture is brought rapidly to or near the boiling temperature.

If, as will usually be the case, the gypsum slurry reduces the sulphuric acid concentration of the titanium sulphate solution below the value most desirable for precipitation, the acid concentration is adjusted before the solution reaches the boiling temperature. We have found a solution containing a total of about 12% of sulphuric acid, including that combined with titanium and that chemically uncombined, to be most desirable for the hydrolytic precipitation of the titanium in the presence of our specially prepared natural gypsum. When the acid concentration of the solution is below this amount, we add to the solution, immediately after mixing the solution with the gypsum slurry, a quantity of concentrated sulphuric acid sufficient to give the solution the desired acid concentration of 12%.

The mixture is maintained at or near the boiling temperature until about 95% of the titanium is precipitated. The composite precipitate is then separated by filtration or other means, washed free of iron with cold water, dried and calcined at a temperature of about 900° C. The calcined pigment is then milled in the usual manner and is ready for use.

The proportion of the gypsum slurry mixed with the titanium solution depends upon the titanium content of the solution and the composition of the composite pigment desired. The method has been found highly satisfactory in making composite pigments containing 30% of titanium dioxide and 70% of calcium sulphate. We will describe the preparation of such a pigment from a typical titanium solution made by digesting ilmenite with sulphuric acid, and showing the following analysis:

| | Percent |
|---|---|
| Titanium (as $TiO_2$) | 7.5 |
| Ferrous iron (as ferrous oxide) | 7.4 |
| Sulphuric acid (free and combined with titanium) | 15.3 |

We mix 853 lbs. of the neutralized gypsum slurry prepared as above described with 700 lbs. of this solution, the solution and the slurry being both at a temperature of 65° C., and then add immediately 95 lbs. of 60° Bé. sulphuric acid to make the acid concentration of the mixture 12%. After precipitation, washing, and calcining, the final product has the following composition:

| | Percent |
|---|---|
| Titanium dioxide | 30 |
| Calcium sulphate | 70 |

The pigment is in the form of an impalpably fine white powder. When examined under high magnification, it is found that the anhedral form of the finely milled natural gypsum has been preserved and that the particles of the composite pigment have an average diameter of 1.5 microns or less. By "anhedral", we mean substantially devoid of the crystal faces produced by normal crystal growth. The calcination removes the water of crystallization of the gypsum, but does not change the external form of the particles.

What is claimed is:

1. The method of making a composite calcium sulphate-titanium dioxide pigment, which comprises wet milling gypsum to an average particle size substantially less than 5 microns in maximum dimension in the presence of a substance which decreases the solubility of the gypsum in water and which at the same time retards crystal growth, mixing the milled gypsum with a mineral acid solution of titanium, and elevating the temperature of the mixture to precipitate hydrated titanium dioxide in the presence of the gypsum particles.

2. The method of making a composite calcium sulphate-titanium dioxide pigment, which comprises wet milling gypsum to an average particle size substantially less than 5 microns in maximum dimension in the presence of a compound which includes one of the radicals of gypsum and which decreases the solubility of the gypsum in water, mixing the milled gypsum with a mineral acid solution of titanium, and elevating the temperature of the mixture to precipitate hydrated titanium dioxide in the presence of the gypsum particles.

3. The method of making a composite calcium sulphate-titanium dioxide pigment, which comprises wet milling gypsum to an average particle size substantially less than 5 microns in maximum dimension in the presence of hydrated lime, mixing the milled gypsum with a mineral acid solution of titanium, and elevating the temperature of the mixture to precipitate hydrated titanium dioxide in the presence of the gypsum particles.

4. The method of making a composite calcium sulphate-titanium dioxide pigment, which comprises wet milling gypsum to an average particle size substantially less than 5 microns in maximum dimension in the presence of an alkali metal sulphate, mixing the milled gypsum with a mineral acid solution of titanium, and elevating the temperature of the mixture to precipitate hydrated titanium dioxide in the presence of the gypsum particles.

5. The method of making a composite calcium sulphate-titanium dioxide pigment, which comprises wet milling gypsum to an average particle size substantially less than 5 microns in maximum dimension in the presence of an organic colloid which decreases the solubility of the gypsum in water and which at the same time retards crystal growth, mixing the milled gypsum with a mineral acid solution of titanium, and elevating the temperature of the mixture to precipitate hydrated titanium dioxide in the presence of the gypsum particles.

6. The method of making a composite calcium sulphate-titanium dioxide pigment, which comprises wet milling gypsum to an average particle size of 1.5 microns diameter in the presence of a substance which decreases the solubility of the gypsum in water and which at the same time retards crystal growth, mixing the milled gypsum with a mineral acid solution of titanium, and elevating the temperature of the mixture to precipitate hydrated titanium dioxide in the presence of the gypsum particles.

7. The method of making a composite calcium sulphate-titanium dioxide pigment, which comprises wet milling gypsum to an average particle size of less than 1.5 microns in diameter in the presence of a substance which decreases the solubility of the gypsum in water and which at the same time retards crystal growth, mixing the milled gypsum with a mineral acid solution of titanium, and elevating the temperature of the mixture to precipitate hydrated titanium dioxide in the presence of the gypsum particles.

8. The method of making a composite calcium sulphate-titanium dioxide pigment, which consists in making a slurry of gypsum in water having dissolved therein hydrated lime amounting to approximately ½% of the amount of gypsum, milling the slurry to an average particle size substantially less than 5 microns in maximum dimension, mixing the milled gypsum with a sulphuric acid solution of titanium and elevating the temperature of the mixture to precipitate hydrated titanium dioxide in the presence of the gypsum particles.

9. The method of making a composite calcium sulphate-titanium dioxide pigment, which comprises mixing gypsum with one and one-half times its weight of water having dissolved therein hydrated lime amounting to 0.35% of the amount of gypsum by weight, milling the slurry to an average particle size of 1.5 microns diameter, mixing the milled gypsum with a sulphuric acid solution of titanium, and elevating the temperature of the mixture to precipitate hydrated titanium dioxide in the presence of the gypsum particles.

10. The method of making a composite calcium sulphate-titanium dioxide pigment, which comprises wet milling gypsum to an average particle size substantially less than 5 microns in maximum dimension in the presence of a substance which decreases the solubility of the gypsum in water and which at the same time retards crystal growth, and in the presence of a reducing agent, mixing the milled gypsum with a mineral acid solution of titanium, and elevating the temperature of the mixture to precipitate hydrated titanium dioxide in the presence of the gypsum particles.

11. The method of making a composite calcium sulphate-titanium dioxide pigment, which comprises making a slurry of gypsum in water containing small amounts of hydrated lime and a sulphite, milling the slurry to an average particle size substantially less than 5 microns in maximum dimension, mixing the milled gypsum with a sulphuric acid solution of titanium, and elevating the temperature of the mixture to precipitate hydrated titanium dioxide in the presence of the gypsum particles.

12. The method of making a composite calcium sulphate-titanium dioxide pigment, which comprises mixing gypsum with one and one-half times its weight of water containing in solution hydrated lime amounting to 0.35% of the gypsum by weight and sodium sulphite amounting to 0.2% of the gypsum by weight, milling the slurry to an average particle size of 1.5 microns diameter, mixing the milled gypsum with a sulphuric acid solution of titanium, elevating the temperature of the mixture to precipitate hydrated titanium dioxide on the gypsum particles, and washing the precipitate to remove ferrous compounds.

13. The method of making a composite calcium sulphate-titanium dioxide pigment, which comprises making a slurry of gypsum in water having a small amount of hydrated lime dissolved therein, milling the slurry to an average particle size substantially less than 5 microns in maximum dimension, adding to the slurry sufficient sulphuric acid to neutralize the hydrated lime, immediately mixing the neutralized slurry with a sulphuric acid solution of titanium, and elevating the temperature of the mixture to precipitate hydrated titanium dioxide in the presence of the particles of gypsum.

14. The method of making a composite calcium sulphate-titanium dioxide pigment, which comprises making a slurry of gypsum in water containing in solution small quantities of hydrated lime and a sulphite, milling the slurry to an average particle size substantially less than 5 microns in maximum dimension, adding to the milled slurry sufficient sulphuric acid to convert the hydrated lime and the sulphite into sulphates, immediately mixing the neutralized slurry with a sulphuric acid solution of titanium, and elevating the temperature of the mixture to precipitate hydrated titanium dioxide in the presence of the particles of gypsum.

15. The method of making a composite calcium sulphate-titanium dioxide pigment, which comprises mixing gypsum with one and one-half times its weight of water containing in solution hydrated lime amounting to 0.35% of the gypsum by weight and sodium sulphite amounting to 0.2% of the gypsum by weight, milling the slurry to an average particle size of 1.5 microns diameter, mixing the milled gypsum with a sulphuric acid solution of titanium, adding sufficient sulphuric acid to give the mixture a total acid concentration, including that combined with the titanium and that chemically uncombined, of 12%, elevating the temperature of the mixture to precipitate hydrated titanium dioxide in the presence of the gypsum particles, and washing the precipitate to remove ferrous compounds.

16. An uncalcined composite precipitate comprising hydrated titanium dioxide and anhedral particles of gypsum, the composite precipitate particles having an average size substantially less than 5 microns in maximum dimension.

17. A calcined composite pigment comprising titanium dioxide and anhedral particles of calcium sulphate made by calcining the precipitate claimed in claim 16, the composite pigment particles having an average size substantially less than 5 microns in maximum dimension.

18. An uncalcined composite precipitate comprising hydrated titanium dioxide and anhedral particles of gypsum, the composite precipitate particles having an average size of about 1.5 microns in diameter.

19. A calcined composite pigment comprising titanium dioxide and anhedral particles of calcium sulphate made by calcining the precipitate claimed in claim 18, the composite pigment particles having an average size of about 1.5 microns in diameter.

LONNIE W. RYAN.
WINFRED JOSEPH CAUWENBERG.